Sept. 22, 1936.　　　　　C. C. FARMER　　　　　2,055,107

BRAKE CONTROL MEANS

Filed Nov. 3, 1934

INVENTOR
CLYDE C. FARMER.
BY Wm. M. Cady
ATTORNEY

Patented Sept. 22, 1936

2,055,107

UNITED STATES PATENT OFFICE 2,055,107

BRAKE CONTROL MEANS

Clyde C. Farmer, Pittsburgh, Pa., assignor to The Westinghouse Air Brake Company, Wilmerding, Pa., a corporation of Pennsylvania Application November 3, 1934, Serial No. 751,298

18 Claims. (Cl. 303—24)

This invention relates to brake control means, and in particular to brake control means for trains designed for high speed service.

In trains designed for high speed service it is of the highest importance that the braking equipment employed provide for the highest practical degree of reliability. In fluid pressure brake systems, one manner of providing for this reliability is to arrange the system such that an application of the brakes may be effected either by straight air operation, by automatic operation, or by a combination of the two. In systems of this character there is usually provided on each car in the train a control valve device, and these control valve devices are controlled from the head end of the train through some form of controlling brake valve.

Each control valve device most generally comprises some form of relay valve for controlling all flow to the brake cylinder, and an electrically controlled valve device and an automatic valve device for controlling operation of the relay valve. The electrically controlled valve device controls operation of the relay valve during straight air operation, while the automatic valve device controls operation of the relay valve during automatic operation. In addition to these valve devices, the control valve device usually includes additional electrically actuated valves under the control of a retardation controller device, which valves and retardation controller device function to control the brake cylinder pressure so as to decelerate the train at some predetermined desired rate of retardation. The retardation controller device and electrically actuated valves usually function to first cut off the supply of fluid under pressure to the brake cylinder and subsequently to effect a release of fluid under pressure from the brake cylinder. One of the difficulties heretofore encountered has been that more fluid under pressure has been released from the brake cylinder through this operation than necessary to maintain the desired rate of retardation, with the result that the rate maintained was not maintained constant within tolerable limits. In addition, there has been an undesired cycling operation of the apparatus in alternately supplying fluid under pressure to and releasing it from the brake cylinder, thereby causing unnecessary loss of fluid pressure. It is desirable in practice that the retardation controller device function first to cut off the supply of fluid under pressure to the brake cylinder, and thereafter, as the speed of the train diminishes and the coefficient of friction between the rubbing parts of the brakes increases, to intermittently release fluid under pressure from the brake cylinder without at any time resupplying fluid under pressure thereto.

However, while it is desired that the retardation controller device release from the brake cylinder whatever fluid under pressure is necessary to maintain the desired rate of retardation, an accidental release of total brake cylinder pressure should be guarded against.

In the equipments providing for both straight air and automatic operation as heretofore proposed, the retardation controller device has been effective in controlling only applications effected by straight air operation. It is, of course, desirable that the retardation controller device be effective in controlling applications by either straight air operation or by automatic operation.

With the above considerations in mind, it is a principal object of the present invention to provide a brake equipment in which applications may be effected either by straight air operation or by automatic operation, and in which a retardation controller device may be employed to control applications by either mode of operation.

Another object of the present invention is to provide means for effecting a more gradual release of the brakes in response to operation of the retardation controller device, so as to prevent the needless loss of fluid under pressure and to maintain a more nearly constant rate of retardation.

A yet further object of the invention is to provide means, in connection with an equipment of this character, which will prevent a total loss of brake cylinder pressure in the event of undesired operation of the electrically actuated valves controlled by the retardation controller device.

Yet further and more specific objects of the invention will appear from the following description, which is taken in connection with the single figure of the attached drawing, which shows in schematic and diagrammatic form one arrangement of apparatus which may be employed in carrying out the invention.

Figure 1:
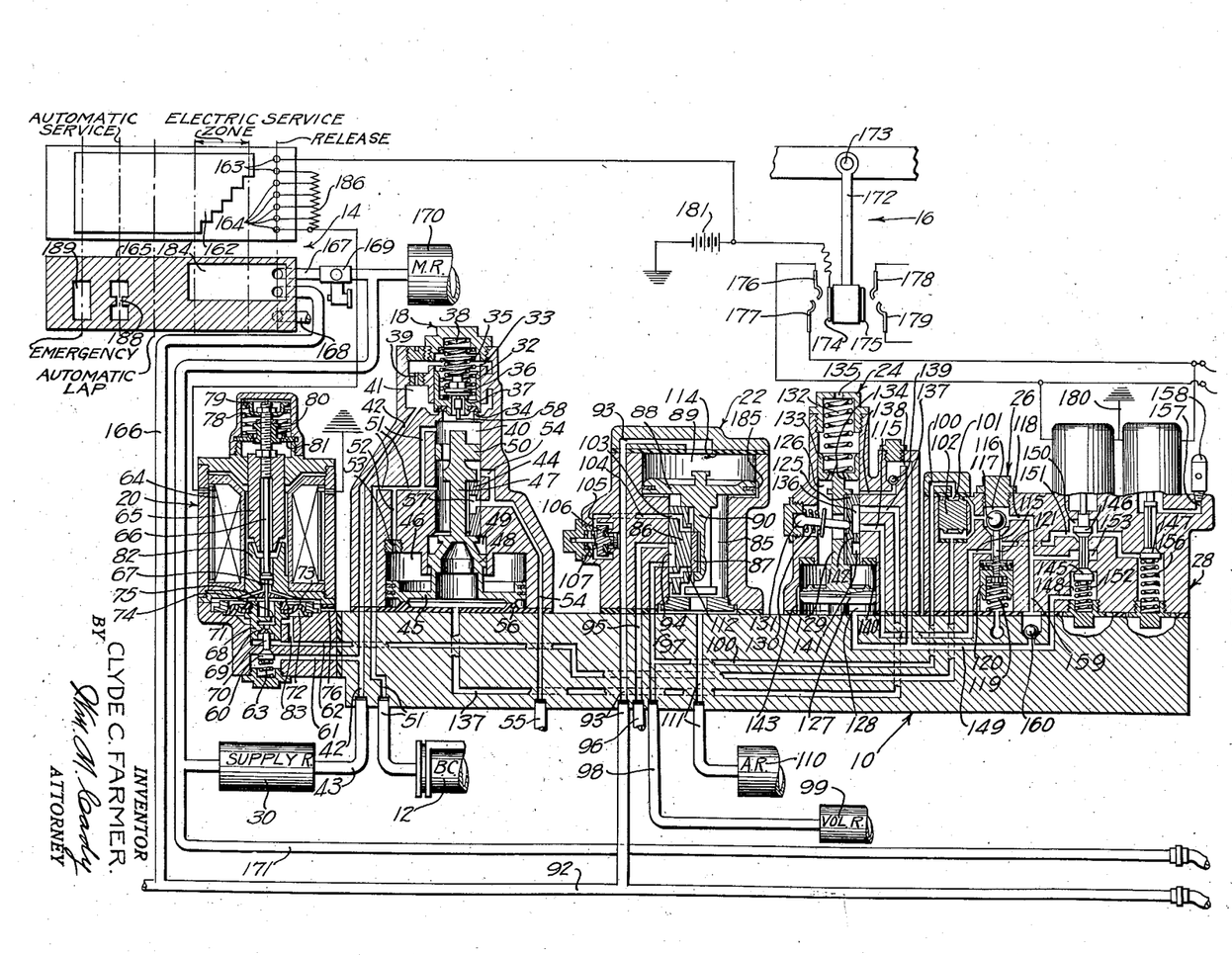

In this drawing, an arrangement for only one car has been shown, but, as will hereinafter more fully appear, portions of the apparatus may be duplicated on other cars in the train, and thus provide for a complete train braking equipment.

In the embodiment illustrated, I have shown a control valve device 10, which operates to control the supply of fluid under pressure to and its release from a brake cylinder 12, whether effected by straight air operation or by automatic operation. One of these control valve devices is located on each car in the train. At the head end of the train, I provide a controlling brake valve device, diagrammatically indicated at 14, and this brake valve device is employed to control operation of all of the control valve devices throughout the train.

In order to limit the rate of retardation produced by an application of the brakes to some predetermined maximum value which will not produce sliding of the wheels, a retardation controller device 16 has been included, and this device functions to control certain electrically operated valve devices, as will more fully appear hereinafter.

Considering now more in detail the control valve device 10, this valve device comprises a relay valve section 18, an electrically controlled self-lapping magnet valve section 20, an automatic valve section 22, a pneumatic cut-off valve section 24, an inshot valve section 26, and a magnet valve section 28.

The relay valve section 18 controls the supply of fluid under pressure from a connected supply reservoir 30 to the connected brake cylinder 12. The flow of fluid from the reservoir to the brake cylinder is controlled by a supply valve 32, which is disposed in a valve chamber 33. The valve 32 is urged toward a seat 34 by a spring 35. Disposed within the supply valve 32 is a pilot valve 36, urged toward a seat 37 by a spring 38.

When the pilot valve 36 is seated, the fluid pressure acting upon the valve 32 from the valve chamber 33, plus the pressure of spring 35, will hold the valve upon its seat 34. When the pilot valve 36 is actuated to unseated position, fluid under pressure in the valve chamber 33 is released past the unseated pilot valve to a slide valve chamber 40 at a rate faster than it can be supplied to the valve chamber 33 through a choke 39 from a supply chamber 41, which is in communication with the supply reservoir 30 by way of passage 42 and pipe 43. As a consequence, the pressure on the upper side of the valve 32 is reduced and the valve can then be unseated by a relatively small pressure from below. When the valve 32 is unseated, fluid under pressure may flow from the supply chamber 41, and the supply reservoir 30, to the slide valve chamber 40.

Disposed in the slide valve chamber 40 is a slide valve 44, and for operating the slide valve and for unseating the pilot valve 36 and the main supply valve 32, there is provided a piston 45 disposed in a piston chamber 46 and having a stem 47. The piston stem 47 is provided with an enlarged flanged portion 48 interfitting with a bore 49, for the purpose of providing a seal between the piston chamber 46 and the slide valve chamber 40 as the piston 45 moves. Also, the stem 47 is provided with a guiding element 50 for guiding movement of the stem when the piston 45 is moved upwardly and downwardly. The slide valve 44 is carried in a recess in the stem 47 and its movement is coextensive with the movement of the piston 45.

The slide valve chamber 40 is in constant communication with the brake cylinder 12 by way of pipe and passage 51, and is also in restricted communication with the piston chamber 46 by way of passage 52, in which is disposed a choke 53. The slide valve 44 controls communication between the slide valve chamber 40 and the atmosphere, by way of passages 54 and pipe 55.

In release position of the relay valve section 18, which is that shown in the drawing, the piston 45 is in its lowermost position, where an annular flange thereon contacts and seals with a corresponding annular portion of a gasket 56. In this position, the slide valve 44 uncovers one passage 54 and a port 57 therein registers with the other passage 54, so that fluid pressure may be released from the slide valve chamber 40, and the connected brake cylinder 12, to the atmosphere by way of passages 54 and pipe 55.

When the relay piston 45 is actuated upwardly to application position, slide valve 44 blanks both passages 54, to cut off communication from the slide valve chamber 40 and the brake cylinder 12 to the atmosphere, and thereafter the upper end of the piston stem 47 first engages stem 58 of the pilot valve 36, to partially unload the main supply valve 32, and then engages and unseats the main supply valve. Unseating of this supply valve effects a supply of fluid under pressure to the slide valve chamber 40 and the brake cylinder 12, through the passages heretofore indicated.

Relay piston 45 is actuated to application position by the supply of fluid under pressure to the volume therebelow. When fluid under pressure is thus supplied below the piston, it acts initially upon the piston area within the annular flange in engagement with the gasket 56, and as soon as the piston is lifted from the gasket, fluid pressure then acts upon the total piston area and thus causes the piston to move quickly upwardly to application position.

When the supply of fluid under pressure to the volume below the piston has been cut off, the pressure of fluid flowing to the space above the piston, through the choke 53, equalizes with that below, whereupon the piston moves downwardly until the supply valve 32 is seated. The supply of fluid under pressure to the brake cylinder is then lapped.

The supply of fluid under pressure to the volume below relay piston 45 is primarily controlled by the self-lapping magnet valve section 20 during straight air operation, or by the automatic valve section 22 during automatic operation, and secondarily by the inshot section 26, the magnet valve section 28, and the pneumatic cut-off valve section 24, during either operation.

The self-lapping magnet valve section 20 is provided with a supply valve 60, which controls the flow of fluid under pressure from the supply reservoir 30 to the volume below relay piston 45, by way of pipe 43, passages 42 and 61, past supply valve 60 when unseated, to passage 62, and from thence through the inshot valve section and the pneumatic cut-off valve section, as will hereinafter be more fully described.

The supply valve 60 is urged toward seated position by a spring 63, and toward unseated position by action of an electro-magnet having a winding 64, which when energized actuates members to be described to unseat the valve. When the winding 64 is energized, the magnetic effect produced thereby actuates a movable core member 65 downwardly. Secured to the core member 65 is a stem 66 which engages a pin 67 to actuate a sliding member 68. The sliding member 68 is provided with a valve seat 69 which engages and interfits with the upper end of the stem of the supply valve 60, which end forms a release valve 70, controlling the release of fluid pressure from the volume below relay piston 45.

The sliding member 68 is normally held in an upper or release position by a resilient diaphragm 71, which is secured thereto and to the casing embodying the self-lapping valve device in a manner to form a chamber 72 therebelow and a chamber 73 thereabove. When the sliding member 68 is in its upper or release position, the release valve 70 is unseated, so that fluid pressure is released from the volume below relay piston 45 to the atmosphere, past the unseated release valve, through an orifice 74, passage 75, and port 76.

When the sliding member 68 is actuated downwardly the release valve 70 is seated, to cut off this communication to the atmosphere, and the supply valve 60 is unseated, to effect a supply of fluid under pressure to the underside of the relay piston.

The downward movement of the sliding member 68 is, as aforesaid, caused by downward movement of the core member 65. The downward movement of the core member 65 is opposed by a spring 78 reacting against a spring cup 79 secured to the upper end of the stem 66. The downward movement of the core member 65 and the stem 66 is governed or limited by a flanged collar 80, which is adapted to engage a stop washer 81 upon a predetermined downward movement of the core and stem.

As may be seen from the construction shown in the drawing, the spring cup 79 and the flanged collar 80 may be adjusted to different positions on the stem 66. The stem 66 may be also adjusted with respect to the core member 65 by means of the screw-thread connection shown.

The lower end of the core member 65 is preferably of a bevelled configuration, as shown in the drawing, and interfits with a corresponding recessed portion in a stationary core member 82, so as to provide an air gap therebetween of somewhat decreased reluctance. The casing embodying the valve device provides the return path for the magnetic flux established by the energized winding 64.

When the winding 64 is energized, the release valve 70 is first seated and the supply valve 60 is next unseated an amount in accordance with the downward movement of the stem 66 and movable core 65. This movement is opposed by the spring 78 and the unseating of the supply valve 60 is thus determined by the degree of energization of the winding 64.

When the supply valve 60 is unseated, fluid under pressure also flows to the chamber 72 below the diaphragm 71, by way of passage 83, and when the fluid pressure acting below the diaphragm overbalances that acting downwardly on the diaphragm due to the magnetic pull on the core member 65, the sliding member 68 is actuated upwardly to permit supply valve 60 to be seated by spring 63. The supply of fluid under pressure to the volume below relay piston 45 will then be lapped.

If the pressure below diaphragm 71 is great enough, release valve 70 may be unseated to release pressure from below the relay piston. If, on the other hand, after supply valve 60 is seated, the pressure below the diaphragm should diminish, due to leakage or for other reasons, the diaphragm will be actuated downwardly by the magnetic force above, to unseat the supply valve and thus readmit fluid under pressure to the volume below the relay piston. The self-lapping magnet valve portion thus operates to supply and maintain a pressure to the relay valve section in accordance with the current supplied to the winding 64.

As before indicated, the supply of fluid under pressure to the volume below relay piston 45 may be also controlled by the automatic valve section 22. This section is provided with a slide valve chamber 85 in which is disposed a main slide valve 86 and a graduating valve 87. For operating the main and graduating valves there is provided a piston 88, disposed in a piston chamber 89. The piston 88 is provided with a stem 90 adapted to move the graduating valve 87 coextensive therewith, and to move the main slide valve 86 with a delayed or lost motion.

The piston chamber 89 is in communication with a brake pipe 92 by way of pipe and passage 93. When the pressure in the brake pipe is normal, that is, maintained at a predetermined value, the piston 88 is in its lowermost position, as shown in the drawing, which is also the release position. In this release position, a cavity 94 in the main slide valve 86 connects a passage 95, which leads to the atmosphere by way of pipe 96, with a passage 97, which has two branches, one branch leading by way of pipe 98 to a volume reservoir 99, and the other branch leading by way of passage 100 to a double check valve chamber 101 in which is disposed a double check valve 102.

In release position, the main slide valve 86 also has a port 103 in registration with a passage 104 leading to a valve chamber 105, in which is disposed a fast recharge valve 106, urged toward a seated position by a spring 107. This fast recharge valve 106 controls communication between the passage 104 and the brake pipe passage 93, as will hereinafter be more fully referred to.

The slide valve chamber 85 is connected to an auxiliary reservoir 110 by way of pipe and passage 111. When the pressure in the piston chamber 89 is reduced at a service rate, the overbalancing pressure beneath the piston in the slide valve chamber actuates the piston upwardly to service position. In service position, the main slide valve 86 blanks the two passages 95 and 104, and brings port 112 therein in registration with the passage 97, the graduating valve 87 having uncovered the port 112 at this time. Fluid under pressure then flows from the main slide valve chamber 85, and the auxiliary reservoir 110, to both the volume reservoir 99 and to the double check valve chamber 101, according to the degree of reduction in brake pipe pressure.

The pressure of fluid supplied to the double check valve chamber 101, above the double check valve 102, will actuate the double check valve to lower position, and thereafter fluid under pressure will flow to the volume below relay piston 45, through the inshot valve section, as will more fully appear presently.

When the pressure in piston chamber 89 is reduced at an emergency rate, the piston 88 moves upwardly and seals against gasket 114, and the main slide valve 86 uncovers passage 97 while blanking passages 95 and 104. Fluid under pressure then flows from the slide valve chamber 85 and the auxiliary reservoir 110, to both the volume reservoir 99 and the volume below relay piston 45, until equalization takes place.

As before stated, fluid under pressure supplied to the volume below relay piston 45, by operation of the self-lapping magnet section 20, also flows through the inshot valve section 26, flowing first to the double check valve chamber 101, where the pressure of the fluid actuates the double check valve 102 to its upper position. From the double check valve chamber 101, the flow is to a ball valve chamber 116, and from this chamber the flow is initially through two branches, one branch being past an unseated ball valve 117 to a passage 115 and the other being through a passage 118 leading through the magnet valve section 28.

The ball valve 117 is urged toward an unseated position by action of a spring 119 acting upon a piston 120 having a stem 121 engaging the ball valve. When the ball valve is in unseated position, fluid under pressure may flow from chamber 116 past the unseated ball valve to the passage 115. As the pressure of the fluid supplied to the passage 115 increases, it acts upon the upper side of the inshot piston 120 and actuates the piston downwardly. When the pressure thus acting on this piston reaches a predetermined value, the ball valve 117 will be seated. After the ball valve is seated, the flow of fluid takes place only through the passage 118, which, as will be described presently, leads through the pneumatic cut-off valve section 24 to the volume below relay piston 45.

The pneumatic cut-off valve section 24 is provided with a slide valve 125, disposed in a slide valve chamber 126, and a piston 127 disposed in a piston chamber 128. The piston 127 has a stem 129 adapted to actuate the slide valve 125 coextensive with movement of the piston. A spring 130 and loading stem 131 operate to hold the valve 125 upon its seat. A second spring 132 acts upon a cup 133 integral with the end of the piston stem 129 to urge the piston 127 downwardly to a normal or biased position. The cup 133 is apertured at 134 to connect the slide valve chamber 126 with the atmosphere through a port 135.

When the piston 127 is in its lowermost position, a cavity 136 in the slide valve 125 connects the aforementioned passage 115 with a passage 137 leading to the volume below relay piston 45. At the same time, the slide valve 125 uncovers a passage 138, in which is disposed a ball check valve 139.

The piston 127 is actuated upwardly by the supply of fluid under pressure to the piston chamber 128. When the piston 127 is actuated upwardly, it seals against a gasket 140, and cavity 136 in slide valve 125 connects passages 137 and 138, and cavity 141 registers with passage 115. A choke 142 connects the two slide valve cavities 136 and 141, so that there exists a restricted communication between passages 115 and 137, for a purpose which will appear presently.

When the pressure in piston chamber 128 is released, the piston 127 moves to its lowermost position, where a groove 143 connects the piston chamber to slide valve chamber 126, and hence to the atmosphere.

The supply of fluid under pressure to the piston chamber 128 is controlled by the magnet valve section 28. This section is provided with a supply valve 145, a cut-off valve 146, and a release valve 147. The supply valve 145 is disposed in a valve chamber 148, which is in constant communication with the aforementioned piston chamber 128 by way of passage 149. The cut-off valve 146 is disposed in a chamber 150, which is in communication with the aforementioned passage 115 through another passage 151.

The supply valve 145 is urged toward seated position and the cut-off valve 146 toward unseated position by a spring 152. The supply valve 145 is actuated to unseated position and the cut-off valve 146 to seated position by action of an electromagnet in the upper part of the casing, which when energized actuates the two valves downwardly.

When the supply valve 145 is seated and the cut-off valve 146 is unseated, fluid under pressure may flow through the aforementioned passage 118, and an intermediate chamber 153, past the unseated cut-off valve 146 to the volume below relay piston 45, through the passages shown and in a manner which will hereinafter be more fully referred to. When the supply valve 145 is unseated and the cut-off valve 146 seated, the supply just referred to is cut off, and fluid under pressure may then flow from the intermediate chamber 153, past the unseated supply valve 145 to chamber 148, from whence it flows to piston chamber 128 through passage 149.

The aforementioned release valve 147 is urged toward seated position by a spring 156, and toward unseated position by action of another electromagnet in the casing, which when energized actuates the release valve downwardly. When the release valve 147 is in unseated position, a communication is established from the chamber 159, which leads to the volume below relay piston 45, to the atmosphere, which communication leads past the unseated release valve 147, and through a passage 157 to a safety valve device 158.

This safety valve device 158 may be of one of a large number of types, and I do not desire to be limited to any one specific type. The function of the safety valve device, as is well known in the art, is to permit a release of fluid pressure from the volume to which it is connected, down to a predetermined value, whereupon the safety valve device operates to prevent further release of fluid pressure. It is to be here understood that the safety valve device will be set to retain in the volume below relay piston 45, a pressure sufficient to insure that the train will be brought to a stop should the release valve 147 fail to seat upon deenergization of its actuating electromagnet.

As shown in the drawing, the aforementioned passages 118 and 149 are connected by another passage 159 having a ball check valve 160 disposed therein. The purpose of this additional passage and ball check valve will appear presently.

The controlling brake valve device 14, which controls the major operations of the control valve devices 10 throughout the train, may be one of a large number of types, and in the type illustrated may comprise a drum controller portion having a drum 162, adapted to engage and connect together a pair of contact fingers 163 and to thereafter sequentially engage a plurality of contact fingers 164, to electropneumatically control brake application by straight air operation.

The brake valve device may also include a rotary valve portion for effecting and controlling application by automatic operation. This portion is preferably provided with a rotary valve, diagrammatically shown at 165, which is adapted to control communication between a branch pipe 166, connecting with the brake pipe 92, and a feed valve pipe 167, and with an exhaust pipe 168 leading to the atmosphere.

The feed valve pipe 167 connects with a feed valve device 169, which in turn connects to a source of fluid under pressure, as for example a main reservoir 170. The feed valve device 169 is preferably of one of the standards types commonly employed, and, as is well known in the art, is provided for the purpose of maintaining a substantially uniform pressure of the fluid supply from the main reservoir 170.

The drum controller and rotary valve portions are preferably combined in a manner such that both may be operated by manipulation of a single control element, as for example the familiar brake valve handle. This control element, or handle, is movable to different positions, as indicated in the diagrammatic representation shown in the drawing and as will hereinafter be more fully referred to.

In order that the supply reservoirs 30 throughout the train shall be charged at all times, a supply pipe 171 is provided which extends throughout the train. Each of the supply reservoirs 30 is then connected to this pipe, so that the supply reservoirs are at all times charged to main reservoir pressure.

The retardation controller device 16 may also be of one of a large number of types and for that reason I have shown in more or less diagrammatic form a pendulum type which may be employed. In this type a pendulum 172 is freely suspended from a frictionless pivot 173 and carries therewith and insulated therefrom contacts 174 and 175.

The retardation controller device is positioned on the vehicle, so that the pendulum 172 is swung to the right or left according to the rate of speed change of the vehicle. As the pendulum 172 swings to the left, its contact 174 will first engage a stationary and resiliently supported contact 176, and thereafter another and similar stationary contact 177. As the pendulum swings to the right, it engages in a similar manner similar stationary contacts 178 and 179.

Considering first the contacts to the left, the contact 176 is connected to the electromagnet in the magnet valve section 28, of each control valve device, controlling the cut-off valve 146 and the supply valve 145, and the contact 177 is connected to the electromagnet controlling the release valve 147. The other terminal of each of these electromagnets is connected to a ground connection 180. The movable contact 174 of the retardation controller device is connected to one terminal of a battery 181. The other terminal of the battery 181 is also connected to a ground connection, so that as the movable contact 174 engages the stationary contacts 176 and 177, the electromagnets in the magnet valve section 28 will be energized.

Now, if when the train is decelerating the pendulum 172 swings to the left, it will be obvious that contacts 174 and 176 will be brought into engagement at one rate of retardation, and that contacts 174 and 177 will be brought into engagement at a higher rate of retardation. The cut-off valve 146 will then be seated and the supply valve 145 unseated when the first two of these contacts engage, and the release valve 147 will be unseated when the second of these contacts engage.

When it is desired that the same result be accomplished for either direction of swing of the pendulum 172, then contact 178 is connected to contact 176, contact 179 is connected to contact 177, and contacts 174 and 175 are connected together. If, however, it is desired that contacts 178 and 179 be employed in connection with controlling the acceleration of the train, then these contacts may be connected to an acceleration control apparatus as described and claimed in the copending application of Clyde C. Farmer, Serial No. 707,918, filed January 23, 1934.

The operation of this embodiment of my invention is as follows:

*Running condition*

When the train is running, the brake valve device 14 at the head end of the train is maintained in "Release" position, in which the active part of the brake valve device will be in the position shown in the drawing. As will be observed, in this position, the drum 162 is out of engagement with the contact fingers and the rotary valve 165 connects the feed valve pipe 167 with the brake pipe branch pipe 166, by way of a port 184.

The brake pipe pressure is thus maintained uniform by the feed valve device 169, and each auxiliary reservoir 110 is charged from the brake pipe 92 by way of charging groove 185 in the automatic valve section 22. With the brake pipe pressure maintained at normal, each automatic valve piston 88 will be maintained in its lower position, as shown.

At the same time, in each self-lapping magnet valve section 20, the supply valve 60 will be seated and the release valve 70 unseated, so that the volume below the relay piston 45 will be in communication with the atmosphere and the relay piston will be in its lowermost or release position. The brake cylinder connected to each control valve device will then be in communication with the atmosphere, and the brakes will thus be held released.

The other parts of the apparatus shown will be substantially in the positions indicated.

*Service application*

When it is desired to effect a service application of the brakes, the brake valve device is operated through the zone indicated as "Electric service zone". When the drum 162 thus engages and connects together the fingers 163, current will be supplied from the battery 181 to each self-lapping magnet valve winding 64, through a resistance 186. As the drum 162 rotates, it sequentially engages the contact fingers 164 to progressively cut out portions of the resistance 186 and thereby energize each winding 64 according to operation of the brake valve device through the "Electric service zone".

With the winding 64 in each control device energized, the core member 65 is actuated downwardly to first effect seating of release valve 70 and subsequently unseating of the supply valve 60. Fluid under pressure then flows from the supply reservoir 30 to the volume below relay piston 45, through a communication including pipe 43, passages 42 and 61, past the unseated supply valve 60, passage 62, double check valve chamber 101 (where double check valve 102 is actuated to upper position), and from thence to the volume below relay piston 45 by way of two paths. The first of these paths includes ball valve chamber 116, past the unseated ball valve 117, passage 115, slide valve cavity 136, and passage 137. The second of these paths includes ball valve chamber 116, passage 118, intermediate chamber 153, past the unseated cut-off valve 146, chamber 150, passages 151 and 115, and from thence to the volume below relay piston 45 as previously described.

Fluid pressure beneath the relay piston 45 actuates the piston and slide valve 44 upwardly to cut off the communication between the slide valve chamber 40 and the atmosphere, and to effect unseating of the main supply valve 32. Fluid under pressure then flows from the supply reservoir 30 to the slide valve chamber 40 and from thence to the brake cylinder 12.

As the pressure on the under side of relay piston 45 builds up, a value will be reached at which the inshot piston 120 will be actuated downwardly far enough to seat the ball valve 117. Thereafter the flow of fluid to the under side of relay piston 45 will be by way of the other path described. The pressure at which the ball valve 117 seats is selected as that corresponding to a brake cylinder pressure which will insure that the train will be brought to a stop in case the other path past cut-off valve 146 should be closed. This brake cylinder pressure is preferably well below that generally obtaining in normal full service application, in which the retardation controller device is effective.

The supply of fluid under pressure to the relay valve section will be lapped by the self-lapping magnet valve section when the pressure reaches a value corresponding to the brake valve movement, and when the supply thereto has been lapped the relay piston 45 will move to lap position.

In the train, each self-lapping magnet valve section of each control valve device will operate independently of every other self-lapping magnet valve section, so that the brake cylinder pressures effected will be substantially uniform throughout the train, and according to the position of the brake valve handle, regardless of differences in piston travel, leakage, etc.

As pressure builds up in the brake cylinders, the train begins to decelerate. If the rate of retardation produced by application of the brakes is sufficient to cause the pendulum 172, of the retardation controller device 16, to swing far enough to the left to cause engagement of contact 174 with contact 176, then each electromagnet controlling a combination of supply valve 145 and cut-off valve 146 will be energized, and the two valves will be actuated to lower position, to cut off the supply of fluid under pressure to the volume below relay piston 45, and to supply fluid under pressure to piston chamber 128, in each pneumatic cut-off valve section 24. If the relay piston 45 has not already moved to lap position, then it will lap according to the pressure of fluid supplied thereto when the cut-off valve 146 seats.

With fluid under pressure supplied to the piston chamber 128, piston 127 and slide valve 125 are actuated upwardly, and as before described, cavity 136 connects passages 137 and 138, and passages 115 and 137 are connected through choke 142.

If, now, the rate of retardation should increase to the point where retardation controller contact 174 engages contact 177, then each electromagnet controlling a release valve 147 will be energized, and the release valve will be unseated. Unseating of this release valve releases fluid under pressure from the volume below relay piston 45, through a communication including passage 137, slide valve choke 142, passage 115, passage 151, chamber 150, past unseated release valve 147, and the safety valve device 158. Since the choke 142 is now connected in this communication, the effect of this release of pressure upon the operation of the relay valve section 18 will be more gradual than were the release effected through an unrestricted communication. As a result, the relay valve section functions to release pressure from the brake cylinders more gradually, because the piston 45 moves slowly downwardly to only partially, or crack, open the exhaust passages 54.

As the rate of retardation diminishes due to this release of pressure from the brake cylinders, the pendulum 172 swings back to the right until contact 174 disengages from contact 177. Each release valve 147 will then be seated and the parts of each control valve device will again resume lap position, with the cut-off valve piston 127 remaining in upper position.

As the speed of the vehicle diminishes, the coefficient of friction between the rubbing parts of the brakes increases so that the rate of retardation increases. When this takes place, the pendulum 172 will again swing to the left to effect a further release of fluid pressure from the brake cylinders. Since for each release effected by the retardation controller device, the choke 142 is in the communication through which fluid under pressure is released, the variations in the rate of retardation of the train will be small and a more uniform rate of retardation will be maintained.

If, when the retardation controller contact 174 disengages from the contact 177, the release valve 147 should fail to be seated, then a total release of the brakes would result were it not for the safety valve device 158. As before explained, the safety valve device is set so that when the pressure falls to a predetermnied value, the safety valve device functions to cut off the communication to the atmosphere and thereby prevent further release. Sufficient pressure is then maintained in the volume below relay piston 45 to insure that the train will be brought to a stop.

When it is desired to effect a release of the brakes following a service application, the brake valve device 14 is operated to "Release" position, whereupon the self-lapping magnet valve winding 64 is deenergized and a total release of fluid under pressure from the brake cylinder is effected.

If, at the time the brake valve handle is moved to "Release" position, the cut-off valve 146 is seated and the supply valve 145 is unseated, so that cut-off valve piston 127 is in uppermost position, fluid under pressure will be released from the volume below relay piston 45, through the passage 138, past the ball check valve 139. If for any reason the communication past the supply valve 145 should be closed, then the ball valve 160 will unseat to permit the release. In any event a release of the brakes will always occur upon movement of the brake valve handle to "Release" position.

*Auxiliary service application*

In case of failure of the electropneumatic control in effecting an application by straight air operation, a service application by automatic operation may be effected by movement of the brake valve handle to "Automatic service" position. In this position, rotary valve 165 disconnects the brake pipe from the feed valve device 169, and connects the brake pipe to the atmosphere through a port having a restriction 188 therein. The brake pipe is thus vented to the atmosphere at a service rate.

As before explained, a service rate of brake pipe reduction causes the automatic valve piston 88 in each control valve device to move to service position, to effect a supply of fluid under pressure from the connected auxiliary reservoir 110 to the volume below relay piston 45, in accordance with the degree of brake pipe reduction. The flow of fluid from the auxiliary reservoir 110 is through pipe 111, slide valve chamber 85, slide valve port 112, and from thence to the double check valve chamber 101 through passages 97 and 100, and to the volume reservoir 99 through pipe 98. From the double check valve chamber 101 the flow to the under side of relay piston 45 is through the same passages as previously described for a straight air service application.

After a predetermined pressure has been established in the volume below the relay piston 45, the inshot valve piston 120 operates as before to seat the ball valve 117.

The volume reservoir 99 is provided to permit a more flexible control of the pressure of fluid supplied to the volume below relay piston 45 through operation of the automatic valve section 22. If the volume reservoir 99 were not provided, the pressure effected below relay piston 45 would bear a relation to brake pipe pressure reduction much higher than in present standard equipment, and light applications of the brakes could not be effected. By introducing additional volume, a given reduction in brake pipe pressure will effect a pressure below relay piston 45 more nearly in accordance with the ratio of standard automatic brake systems.

Now, since the flow of fluid under pressure to the under side of relay piston 45 passes through the pneumatic cut-off valve section 24 for either straight air operation or automatic operation, it follows that the retardation controller device 16 will function to control brake cylinder pressure for both modes of operation, and as described in connection with service applications by straight operation. Therefore, if the rate of retardation during automatic operation becomes great enough, the retardation controller device 16 will take control and limit the rate as already described.

When it is desired to effect a release of the brakes following an automatic application, the brake valve handle is moved to "Release" position, where the brake pipe is again connected to the feed valve device and brake pipe pressure restored. The automatic valve piston 88 is then actuated to lower position and slide valve cavity 94 connects the volume below relay piston 45 and the volume reservoir 99 to passage 95 and pipe 96 leading to the atmosphere.

At the same time, port 103 in slide valve 86 registers with passage 104, so that the now higher brake pipe pressure unseats the fast recharge valve 106 and fluid under pressure flows past this unseated valve through passage 104 and port 103 to the slide valve chamber 85, from whence it flows to the auxiliary reservoir 110. The auxiliary reservoir is thus recharged at a fast rate, and when the pressure in the reservoir reaches a predetermined value, the fast recharge valve 106 seats and further charging of the auxiliary reservoir takes place through the charging groove 185.

*Emergency application*

When it is desired to effect an emergency application of the brakes, the brake valve handle is moved to the position indicated as "Emergency". In this position, maximum current will be supplied to each self-lapping magnet valve winding 64, and the brake pipe will be vented to the atmosphere through an unrestricted port 189 in the rotary valve 165.

Each self-lapping magnet valve device will operate to supply fluid under pressure to the under side of relay piston 45 to a maximum degree. At the same time, the emergency reduction in brake pipe pressure will cause each automatic valve piston 88 to move to emergency position, to also supply fluid under pressure from each auxiliary reservoir 110 to the under side of each relay piston 45 to a maximum degree. Since the flow from the self-lapping valve section and from the automatic valve section are both to the double check valve chamber 101, it will be obvious that only the supply which dominates in pressure will reach the relay valve section.

Thus during an emergency application, a double supply of fluid under pressure to operate the relay valve section is available, thereby insuring that fluid under pressure will be supplied to the brake cylinders to a maximum degree. It will be noted, however, that in both straight air and automatic applications fluid under pressure is supplied to the brake cylinders from the supply reservoirs 30 only.

During an emergency application, each inshot valve section will function as heretofore described, and the retardation controller device 16 will also function as previously described to limit the maximum rate of retardation.

When it is desired to effect a release of the brakes following an emergency application, the brake valve device is moved to "Release" position, where as before described, each winding 64 is deenergized and each automatic valve piston 88 is actuated to lower position.

While the operation of the embodiment illustrated has been described in connection with operation from one end only, it will be quite apparent that another brake valve device 14 may be provided at the rear end of the train and similar connections made as for the brake valve device at the head end of the train, so that if it is desired to operate the train in either direction control from either direction may be effected.

While I have illustrated and described one particular embodiment of my invention, it will be quite apparent to those skilled in the art that many changes therein and modifications thereof may be made, and I do not wish to be limited to the specific embodiment shown, or otherwise than by the spirit and scope of the appended claims.

Having now described my invention, what I claim as new and desire to secure by Letters Patent, is:

1. In a vehicle or train braking system, the combination with a brake cylinder, of a valve device operated upon an increase in pressure for effecting a supply of fluid under pressure to said brake cylinder, means for establishing a communication through which fluid under pressure is supplied to operate said valve device, means for effecting a supply of fluid under pressure through said communication by straight air operation, means for effecting a supply of fluid under pressure through said communication by automatic operation, a second valve device controlling said communication and operable upon an increase in pressure to connect a restriction in said communication through which fluid under pressure is released from said first valve device, a retardation controller device, and means responsive to operation of said retardation controller device for effecting a supply of fluid under pressure to operate said second valve device.

2. In a train braking system, the combination with a brake cylinder, of a pressure operated valve device for controlling the supply of fluid under pressure to said brake cylinder, means for establishing a communication having parallel branch paths through which fluid under pressure is supplied to operate said pressure operated valve device, a valve device in one of said branch paths operated upon a predetermined pressure for closing said path, a second valve device operated upon an increase in pressure for controlling said communication to said pressure operated valve device, and an electrically operated valve device in said other branch path operable to close said path and to effect a supply of fluid under pressure to operate said second valve device.

3. In a train braking system, the combination with a brake cylinder, of a pressure operated valve device for controlling the supply of fluid under pressure to said brake cylinder, means for establishing a communication through which fluid under pressure is supplied to operate said pressure operated valve device, a valve device operated upon an increase in pressure for controlling said communication, and an electrically operated valve device for also controlling said communication and operable to effect a supply of fluid under pressure to operate said last mentioned valve device.

4. In a train braking system, the combination with a brake cylinder, of a pressure operated valve device for controlling the supply of fluid under pressure to said brake cylinder, means for establishing a communication through which fluid under pressure is supplied to operate said pressure operated valve device, a valve device for controlling said communication and operable upon an increase in pressure for connecting a restriction in said communication, an electrically operated valve device for also controlling said communication and operable when energized to close said communication and to effect a supply of fluid under pressure to said last mentioned valve device, and a retardation controller device for controlling said electrically operated valve device.

5. In a train braking system, the combination with a brake cylinder, of a pressure operated valve device for controlling the supply of fluid under pressure to said brake cylinder, means for establishing a communication through which fluid under pressure is supplied to operate said pressure operated valve device, means for effecting a supply of fluid under pressure to said communication by straight air operation, means for also effecting another supply of fluid under pressure to said communication by automatic operation, a valve device operated upon an increase in pressure for controlling said communication, an electrically operated valve device for also controlling said communication and for controlling said last mentioned valve device, and a retardation controller device for controlling said electrically operated valve device.

6. In a train brake system, the combination with a brake cylinder, of a pressure operated valve device for controlling the supply of fluid under pressure to and its release from said brake cylinder, means for establishing a communication through which fluid under pressure is supplied to operate said pressure operated valve device, a valve device operated upon an increase in pressure to connect a restriction in said communication, valve means for effecting a supply of fluid under pressure to operate said last mentioned valve device, an electrically operated release valve device operable to effect a release of fluid under pressure from said pressure operated valve device through said restriction, and a retardation controller device for controlling said valve means and said electrically operated release valve device.

7. In a train braking system, the combination with a brake cylinder, of a pressure operated valve device for controlling the supply of fluid under pressure to said brake cylinder, a reservoir, means for establishing a communication having parallel branch paths between said reservoir and said pressure operated valve device, an electrically controlled self-lapping valve device for controlling the supply of fluid under pressure from said reservoir to said pressure operated valve device, a valve device in one of said branch paths operated upon a predetermined pressure for closing said branch path, a second valve device operable to control the release of fluid under pressure from said pressure operated valve device, and a third valve device in said other branch path operable to control said other branch path and also operable to control said second valve device.

8. In a train braking system, the combination with a brake cylinder, of a pressure operated valve device for controlling the supply of fluid under pressure to and its release from said brake cylinder, means for establishing a communication having parallel branch paths through which fluid under pressure is supplied to operate said pressure operated valve device, an electrically controlled self-lapping valve device for controlling the supply of fluid under pressure to said communication, an automatic valve device for controlling another supply of fluid under pressure to said communication, a pneumatically operated valve device controlling said communication and operable upon an increase in pressure to connect a restriction in said communication, an inshot valve device in one of said branch paths operated upon a predetermined pressure for closing said branch path, a magnet valve device in the other of said branch paths operable to close said other branch path and to effect a supply of fluid under pressure to operate said pneumatically operated valve device, release valve means operable to release fluid under pressure from said relay valve device through said restriction, and a retardation controller device for controlling said magnet valve device and release valve means.

9. In a train brake system, the combination with a brake cylinder, of a relay valve device for controlling the supply of fluid under pressure to and its release from said brake cylinder, means for effecting a supply of fluid under pressure to said relay valve device to effect operation thereof, an electrically operated release valve device operable to effect a release of fluid under pressure from said relay valve device, valve means having a restricted port therein, and means for effecting operation of said valve means to connect said restricted port between said electrically operated release valve device and said relay valve device, whereby fluid under pressure released from said relay valve device passes through said restricted port.

10. In a train brake system, in combination, a brake cylinder, a relay valve device operated according to the supply of fluid under pressure thereto for controlling the supply of fluid under pressure to and its release from said brake cylinder, means for establishing a communication through which fluid under pressure is supplied to operate said relay valve device, a second valve device having an unrestricted port through which fluid under pressure is supplied to operate said relay valve device and operable upon an increase in pressure for connecting a restricted port in said communication through which fluid under pressure is released from said relay valve device, a retardation controller device, means responsive to operation of said retardation controller device for effecting operation of said second valve device and for effecting a release of fluid under pressure from said relay valve device through said restricted port.

11. In a train brake system, in combination, a brake cylinder, a relay valve device operated upon the supply of fluid under pressure thereto for controlling the supply of fluid under pressure to and its release from said brake cylinder, means for establishing a communication through which fluid under pressure is supplied to operate said relay valve device, a second valve device having an unrestricted port through which fluid under pressure is supplied to operate said relay valve device and operable upon an increase in pressure for connecting a restricted port in said communication through which fluid under pressure is released from said relay valve device, a retardation controller device, means responsive to operation of said retardation controller device for effecting a release of fluid under pressure from said relay valve device through said restricted port, and a safety valve device operable to prevent release of fluid under pressure from said relay valve device below a predetermined pressure.

12. In a vehicle or train brake system, in combination, a brake cylinder, a relay valve device operated upon an increase in pressure for effecting a supply of fluid under pressure to said brake cylinder and operated upon a decrease in pressure for effecting a release of fluid under pressure from said brake cylinder, means for effecting a supply of fluid under pressure to operate said relay valve device, means operable according to the rate of retardation of the train or vehicle for effecting a release of fluid under pressure from said relay valve device, a second valve device operated upon an increase in pressure for restricting the rate of release from said relay valve device, and a safety valve device operable to prevent release of fluid under pressure from said relay valve device below a predetermined pressure.

13. In a train brake system, in combination, a brake cylinder, a relay valve device operated according to the supply of fluid under pressure thereto for controlling the supply of fluid under pressure to and its release from said brake cylinder, means for establishing a communication through which fluid under pressure is supplied to operate said relay valve device, a supply reservoir, an electrically operated self-lapping valve device operable when energized to effect a supply of fluid under pressure from said supply reservoir to said communication, a brake pipe, an auxiliary reservoir, a volume reservoir, an automatic valve device operated upon a reduction in brake pipe pressure for effecting a supply of fluid under pressure from said auxiliary reservoir to said volume reservoir and to said communication, a selective valve device operable to select between the supply from said supply reservoir and from said auxiliary reservoir, a pneumatically operated valve device having an unrestricted port through which fluid under pressure is supplied to operate said relay valve device and operable upon an increase in pressure for connecting a restricted port in said communication, a retardation controller device, and means operated in response to operation of said retardation controller device for closing said communication and for effecting a release of fluid under pressure from said relay valve device through said restricted port.

14. In a train brake system, in combination, a brake cylinder, a relay valve device operated according to the supply of fluid under pressure thereto for controlling the supply of fluid under pressure to and its release from said brake cylinder, means for establishing a supply communication through which fluid under pressure is supplied to operate said relay valve device, means for effecting a supply of fluid under pressure through said communication to operate said relay valve device, a retardation controller device, means for establishing a release communication through which fluid under pressure is released from said relay valve device, means operated by said retardation controller device at one rate of retardation for cutting off said supply to said relay valve device and for connecting a restriction between said relay valve device and said release communication, and release valve means operated by said retardation controller at another rate of retardation for effecting a release of fluid under pressure from said relay valve device through said release communication.

15. In a train brake system, in combination, a brake cylinder, a relay valve device operated upon an increase in pressure for effecting a supply of fluid under pressure to said brake cylinder and operated upon a decrease in pressure for effecting a release of fluid under pressure from said brake cylinder, means for establishing a communication through which fluid under pressure is supplied to operate said relay valve device, an electroresponsive valve device operable to cut off the supply of fluid under pressure through said communication, an electrically operated release valve device operable to release fluid under pressure from said relay valve device, a valve device operated in response to operation of said electroresponsive valve device for restricting the rate at which fluid under pressure is released from said relay valve device by operation of said electrically operated release valve device, means including a brake valve device for effecting at will a release of fluid under pressure from said relay valve device, and a by-pass communication through which fluid under pressure is released from said relay valve device at an unrestricted rate in response to operation of said brake valve device.

16. In a train brake system, in combination, a brake cylinder, a relay valve device operated upon an increase in pressure for effecting a supply of fluid under pressure to said brake cylinder and operated upon a decrease in pressure for effecting a release of fluid under pressure from said brake cylinder, means for establishing a communication through which fluid under pressure is supplied to operate said relay valve device, a second valve device operable to cut off said communication, means for establishing a by-pass communication around said second valve device, a check valve in said communication operable to prevent supply of fluid under pressure to said relay valve device but operable to permit a release of fluid under pressure from said relay valve device, and a third valve device for controlling connection of said by-pass communication to said relay valve device.

17. In a train brake system, in combination, a brake cylinder, a relay valve device operated upon an increase in pressure for supplying fluid under pressure to said brake cylinder and operated upon a decrease in pressure for effecting a release of fluid under pressure from said brake cylinder, means for establishing a communication through which fluid under pressure is supplied to operate said relay valve device, a magnet valve device operable to close said communication, means for establishing a by-pass communication around said magnet valve device, a valve device operated upon an increase in pressure for connecting a restriction in said first communication and for connecting said by-pass communication to said relay valve device, a release magnet valve device operable to release fluid under pressure from said relay valve device through said restriction, and means operable at will to effect an unrestricted release of fluid under pressure from said relay valve device through said by-pass communication.

18. In a train brake system, in combination, a brake cylinder, a relay valve device for controlling the supply of fluid under pressure to and its release from said brake cylinder, means for establishing a communication having parallel branch paths through which fluid under pressure is supplied to operate said relay valve device, an inshot valve device in one of said branch paths operated upon a predetermined pressure to close said branch path, a cut-off magnet valve device operable to close the other of said branch paths, means for establishing a by-pass communication around said cut-off magnet valve device, a valve device having a restriction and operated in response to operation of said cut-off magnet valve device for connecting said by-pass communication to said relay valve device and for connecting said restriction in said first communication, a release magnet valve device operable to release fluid under pressure from said relay valve device through said restriction, a retardation controller device for controlling said two magnet valve devices, and means for effecting a release of fluid under pressure from said relay valve device through said by-pass communication at an unrestricted rate.

CLYDE C. FARMER.